(12) United States Patent
Umesh et al.

(10) Patent No.: US 8,867,470 B2
(45) Date of Patent: Oct. 21, 2014

(54) MOBILE COMMUNICATION METHOD, RADIO BASE STATION, AND MOBILE STATION

(75) Inventors: Anil Umesh, Tokyo (JP); Mikio Iwamura, Tokyo (JP); Nobuhiko Miki, Tokyo (JP); Yoshihisa Kishiyama, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 42 days.

(21) Appl. No.: 13/579,167

(22) PCT Filed: Feb. 15, 2011

(86) PCT No.: PCT/JP2011/053169
§ 371 (c)(1),
(2), (4) Date: Oct. 24, 2012

(87) PCT Pub. No.: WO2011/099630
PCT Pub. Date: Aug. 18, 2011

(65) Prior Publication Data
US 2013/0039306 A1  Feb. 14, 2013

(30) Foreign Application Priority Data
Feb. 15, 2010 (JP) ................. 2010-030753

(51) Int. Cl.
H04W 72/04 (2009.01)
H04L 5/00 (2006.01)

(52) U.S. Cl.
CPC ......... *H04W 72/0406* (2013.01); *H04L 5/0053* (2013.01); *H04W 72/0413* (2013.01)
USPC ...................................... 370/329; 455/452.1

(58) Field of Classification Search
CPC ........... H04L 5/0053; H04W 72/0413; H04W 72/042; H04W 72/0406
USPC ................ 370/252, 328–330; 455/450–452.2
See application file for complete search history.

(56) References Cited

U.S. PATENT DOCUMENTS

| 2010/0215011 | A1* | 8/2010 | Pan et al. ................ 370/329 |
| 2011/0286411 | A1* | 11/2011 | Kim et al. ................ 370/329 |
| 2012/0009963 | A1* | 1/2012 | Kim et al. ................ 455/509 |
| 2012/0051306 | A1* | 3/2012 | Chung et al. ............. 370/329 |

OTHER PUBLICATIONS

International Search Report w/translation from PCT/JP2011/053169 mailed on Mar. 29, 2011 (3 pages).
3GPP TSG RAN WG1 Meeting #56, "Considerations on DL/UL Transmission in Asymmetric Carrier Aggregation", R1-090781, LG Electronics, Feb. 13, 2009 (4 pages).
3GPP TSG-RAN WG1 Meeting #59bis, "Further Discussion on PDCCH with Cross Carrier Operation", R1-100361, Panasonic, Jan. 22, 2010 (6 pages).

(Continued)

*Primary Examiner* — Kerri Rose
(74) *Attorney, Agent, or Firm* — Osha Liang LLP

(57) ABSTRACT

A mobile communication method according to the present invention comprises: a step A of individually notifying, by a radio base station eNB, a mobile station UE performing CA of correspondence relation between a DL carrier for transmitting an "UL grant" and an UL carrier to which a PUSCH resource is assigned by the "UL grant", and a step B of transmitting, by the mobile station UE, an uplink data signal using the PUSCH resource through the UL carrier based on the above-described correspondence relation when the "UL grant" is received through the DL carrier.

5 Claims, 8 Drawing Sheets

(56) References Cited

OTHER PUBLICATIONS

3GPP TS 36.304 v11.0.0, 3rd Generation Partnership Project; Technical Specification Group Radio Access Network; Evolved Universal Terrestrial Radio Access (E-UTRA); User Equipment (UE) procedures in idle mode (Release 11), Jun. 2012 (33 pages).

3GPP TR 36.912 v10.0.0, 3rd Generation Partnership Project; Technical Specification Group Radio Access Network; Feasibility study for Further Advancements for E-UTRA (LTE-Advanced) (Release 10), Mar. 2011 (62 pages).

3GPP TS 36.300 v11.2.0, 3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 11), Jun. 2012 (201 pages).

Japanese Office Action w/translation for corresponding Japanese Application No. 2010-030753 mailed Mar. 29, 2011 (4 pages).

Japanese Office Action w/translation for corresponding Japanese Application No. 2010-030753 mailed Nov. 29, 2011 (4 pages).

* cited by examiner

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

In an LTE (Long Term Evolution) FDD scheme, one DL (Downlink) carrier and one UL (Uplink) carrier form a pair. An LTE mobile communication system may be operated using a plurality of DL carriers and a plurality of UL carriers, but the correspondence relation between the DL carriers and the UL carriers is one to one.

As illustrated in FIG. 4, a mobile station UE is configured to use only a pair of one DL carrier and one UL carrier at a time point at which the mobile station UE communicates with a radio base station eNB through a radio link.

A mobile station UE in an IDLE (standby) state is configured to select a DL carrier on standby according to a cell selection operation defined in 3GPP TS36.304.

Then, the mobile station UE is configured to specify an UL carrier, which forms a pair with the DL carrier, from broadcast information (specifically, SIB2) in the standby DL carrier.

Herein, on transition from the IDLE state to a CONNECTED (connection) state, the mobile station UE is configured to establish a radio link using the standby DL carrier and the UL carrier forming a pair with the DL carrier.

The radio base station eNB transmits a layer 3 (RRC: Radio Resource Control) message to a mobile station UE in the CONNECTED state to each mobile station UE at a predetermined timing, thereby changing a pair of a DL carrier and an UL carrier for establishing a radio link.

In the LTE scheme, there have been defined an uplink radio resource assignment procedure and a data transmission and reception procedure using PDCCH (Physical Downlink Control Channel) terminated in a layer 1/MAC sub-layer.

Specifically, a radio resource scheduler of the radio base station eNB determines a PUSCH (Physical Uplink Shared Channel) resource of an UL carrier to be assigned to each mobile station UE, and notifies each mobile station UE to be assigned with the PUSCH resource of the determined content through the PDCCH (UL grant) using a DL carrier forming a pair with the UL carrier.

Furthermore, a minimum time unit for assigning a PUSCH resource is a "subframe (TTI: Transmission Time Interval)", and the radio base station eNB determines a mobile station UE to be assigned with the PUSCH resource in each subframe (TTI), and notifies a corresponding mobile station UE of the determined content using the PDCCH (UL grant).

Furthermore, in a bandwidth of an UL carrier, a minimum frequency unit for assigning the PUSCH resource is "RB (Resource Block)".

Here, the PDCCH to be transmitted to each mobile station UE is transmitted in such a way that a CRC part of the PDCCH is masked by a unique identifier (C-RNTI) assigned in advance to each mobile station UE.

Specifically, the PDCCH (UL grant) includes information on the sizes and the like of RB to be assigned to a mobile station UE in the subframe (TTI) and TB (Transport Block) to be generated by the mobile station UE.

As illustrated in FIG. 5, if each mobile station UE attempts to detect the PDCCH (UL grant) in a used DL carrier in each subframe (TTI) and succeeds in decoding the PDCCH (detects "CRC: OK"), the mobile station transmits an uplink data signal using a PUSCH resource designated in the PDCCH through a used UL carrier (an UL carrier forming a pair with the DL carrier).

At this time, since the mobile station UE attempts to unmask the CRC part of the PDCCH by the C-RNTI assigned thereto, a result of the unmasking of the CRC makes no sense ("CRC: NG") in the case of PDCCH assigned to another mobile station UE. Therefore, the mobile station UE determines that PDCCH, a decoding result of which is "CRC: OK", is assigned thereto.

As illustrated in FIG. 6, since a resource for transmitting the PDCCH through a DL carrier is limited, an event may occur, in which all the PDSCH (Physical Downlink Shared Channel) resources and PUSCH resources may not be assigned due to resource shortage.

Meanwhile, in order to further improve frequency use efficiency, improve peak throughput, and reduce transmission delay in the LTE scheme, an LTE-A scheme has been discussed in the 3GPP and the specification work thereof is under progress.

The main function of the LTE-A scheme is to improve user throughput (CA: Carrier Aggregation) by simultaneously setting a plurality of DL carriers and a plurality of UL carriers in one mobile station UE, and performing communication (refer to Non Patent Literatures 2 and 3).

In addition, the LTE-A scheme has been discussed to be used as the same system while maintaining backward compatibility with the LTE scheme, and even in the case of applying CA as illustrated in FIG. 7, each DL carrier forms a pair with an UL carrier specified from broadcast information (SIB2) in the DL carrier.

As a scenario of the CA, there has been discussed a scenario in which the number of DL carriers and the number of UL carriers simultaneously used in a mobile station UE are asymmetrical to each other.

Particularly, since it is general that the user data traffic in a DL is higher than that in an UL, a scenario, in which the number of DL carriers provided as a system or the number of DL carriers supported as implementation of a mobile station UE is larger than the number of UL carriers, has been emphasized.

In this case, since the number of DL carriers is larger than the number of UL carriers, the relation between a DL carrier and an UL carrier specified from the broadcast information (SIB2) in the DL carrier may not only be N-to-one correspondence but also one-to-one correspondence as illustrated in FIG. 8.

CITATION LIST

Non Patent Literature

[NPL 1] 3GPP TS36.304
[NPL 2] 3GPP TS36.300
[NPL 3] 3GPP TS36.912

As described above, when considering a scenario of CA in which the number of DL carriers is larger than the number of UL carriers, in order to reduce the aforementioned problem of the shortage of the resource for transmitting the PDCCH, it is desirable to maximally distribute the transmission of the PDCCH (UL grant) to a plurality of DL carriers used in a system.

However, if a radio base station eNB employs a correspondence relation (Cell specific pair), which is common to cells and is specified from broadcast information (SIB2) in the DL carrier, as the correspondence relation (paring) between the DL carrier for transmitting the PDCCH (UL grant) (that is, detection of the PDCCH (UL grant) by the mobile station UE) and the UL carrier to be assigned with the PUSCH resource by the PDCCH (UL grant), then there occurs a problem that the PDCCH (UL grant) may not be completely distributed to a plurality of DL carriers used in the system.

In the example of FIG. 8, PDCCH (UL grant) for assigning a PUSCH resource in an UL carrier #2 is distributed to a DL carrier #2 and a DL carrier #3, but it is necessary to completely transmit PDCCH (UL grant) for assigning a PUSCH resource in an UL carrier #1 through a DL carrier #1.

If a load of the PDCCH (UL grant) necessary for assigning the PUSCH resource in one UL carrier is set to "1", loads of the DL carrier #2 and the DL carrier #3 are commonly "0.5", but a load of the DL carrier #1 is "1".

SUMMARY OF THE INVENTION

Therefore, the present invention has been achieved in view of the above-described problems, and an object thereof is to provide a mobile communication method, a radio base station, and a mobile station, by which it is possible to distribute PDCCH (UL grant) to a plurality of DL carriers when CA is performed.

A first characteristic of the present embodiment is summarized in that a mobile communication method, in which a mobile station performs communication with a radio base station using a plurality of carriers having different carrier frequencies, comprising, a step A of individually notifying, by the radio base station, the mobile station performing the communication of a correspondence relation between a downlink carrier for transmitting an uplink assignment signal and an uplink carrier to which an uplink resource is assigned by the uplink assignment signal, and a step B of transmitting, by the mobile station, an uplink data signal using the uplink resource through the uplink carrier based on the correspondence relation when the uplink assignment signal is received through the downlink carrier.

A second characteristic of the present embodiment is summarized in that a radio base station comprising, a transmission unit that is configured to individually notify a mobile station, which performs communication with the radio base station using a plurality of carriers having different carrier frequencies, of a correspondence relation between a downlink carrier for transmitting an uplink assignment signal and an uplink carrier to which an uplink resource is assigned by the uplink assignment signal.

A third characteristic of the present embodiment is summarized in that a mobile station, which is configured to perform communication with a radio base station using a plurality of carriers having different carrier frequencies, comprising, a reception unit configured to receive a correspondence relation between a downlink carrier for transmitting an uplink assignment signal and an uplink carrier to which an uplink resource is assigned by the uplink assignment signal from the radio base station, and a transmission unit configured to transmit an uplink data signal using the uplink resource through the uplink carrier based on the correspondence relation when the uplink assignment signal is received through the downlink carrier.

As described above, according to the present invention, when CA is performed, it is possible to provide a mobile communication method, a radio base station, and a mobile station, by which it is possible to distribute PDCCH (UL grant) to a plurality of DL carriers.

DESCRIPTION OF EMBODIMENTS

Mobile Communication System According to First Embodiment of the Present Invention With reference to FIG. 1 to FIG. 3, the configuration of a mobile communication system according to a first embodiment of the present invention will be described.

Figure 1:
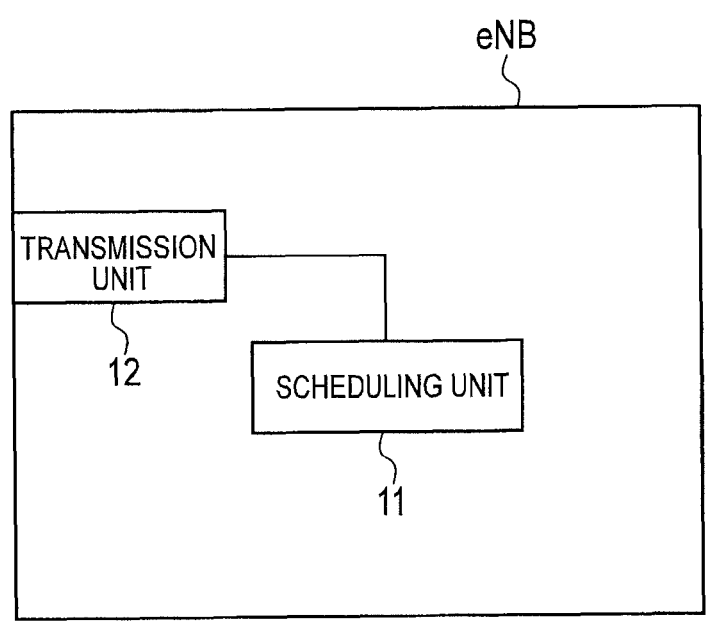
FIG. 1 is a functional block diagram of a radio base station according to a first embodiment of the present invention.
Figure 2:
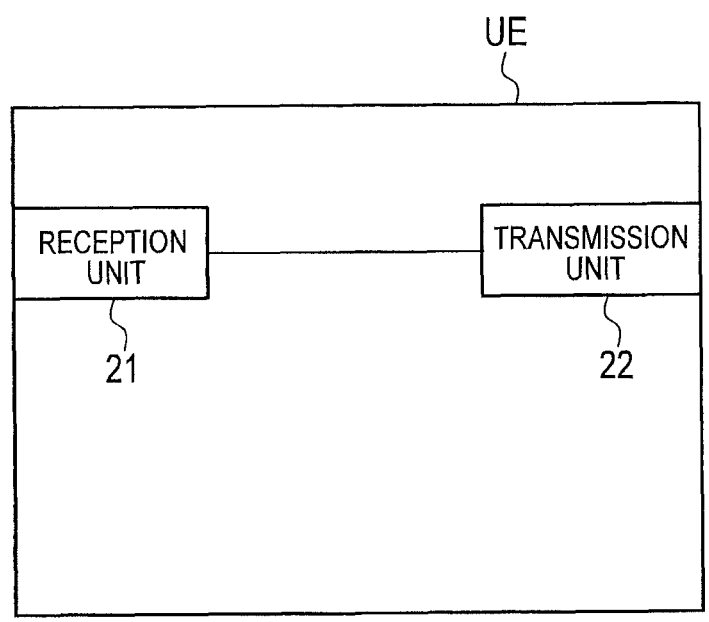
FIG. 2 is a functional block diagram of a mobile station according to the first embodiment of the present invention.

As illustrated in FIG. 1, a radio base station eNB according to the present embodiment includes a scheduling unit 11 and a transmission unit 12, and as illustrated in FIG. 2, a mobile station UE according to the present embodiment includes a reception unit 21 and a transmission unit 22.

Figure 3:
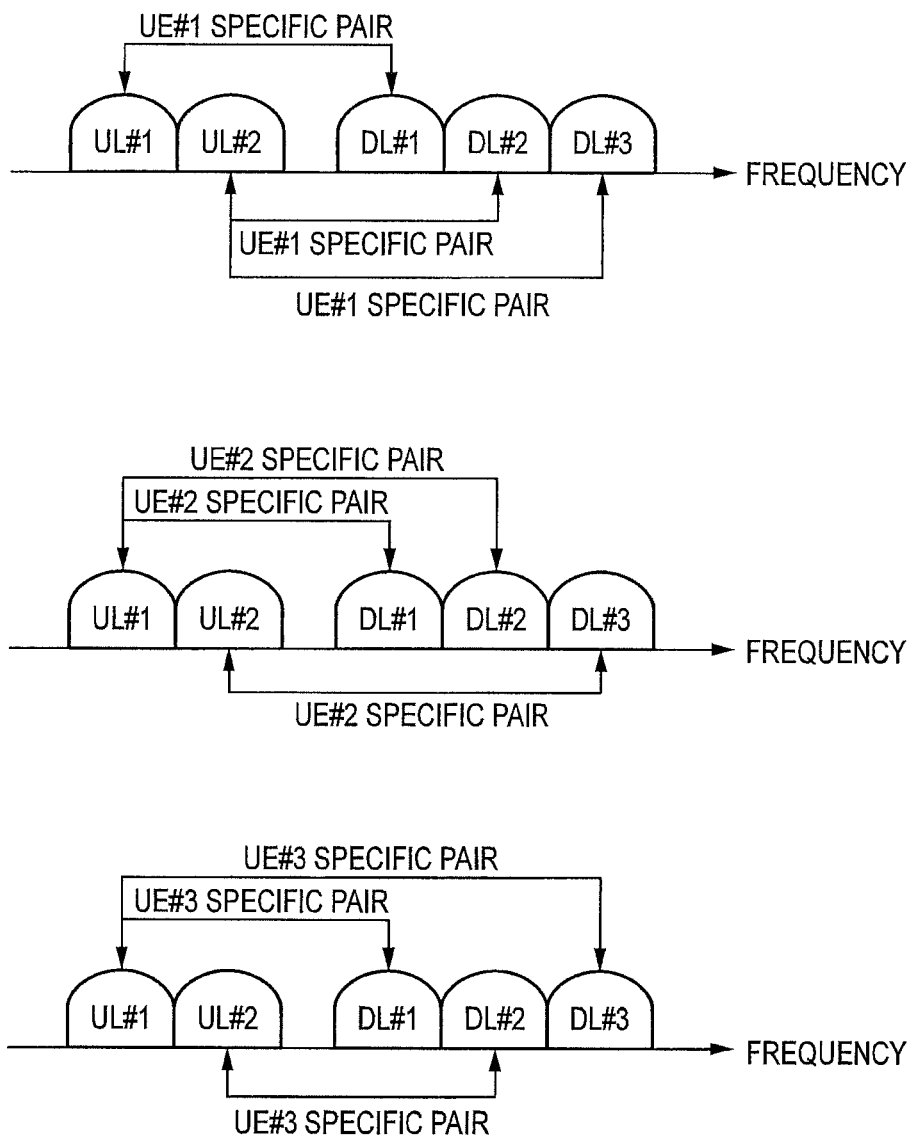
FIG. 3 is a diagram explaining a mobile communication system according to the first embodiment of the present invention.
Figure 4:
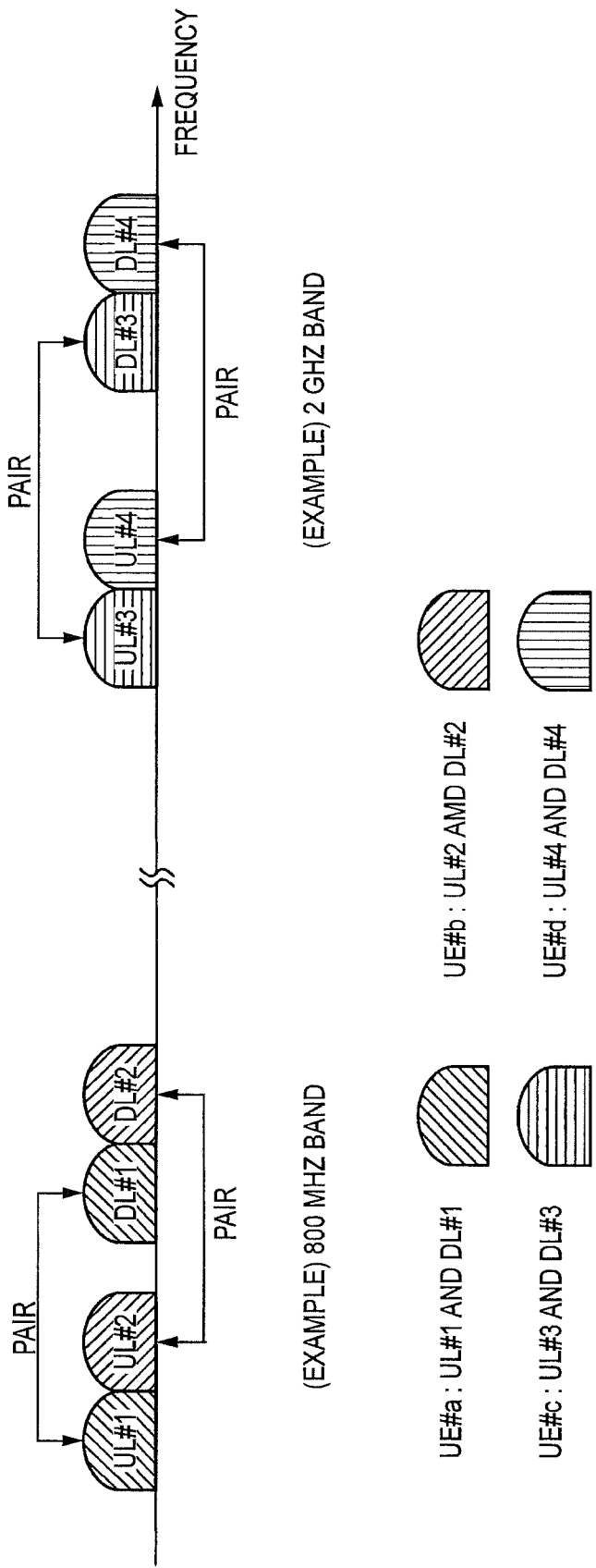
FIG. 4 is a diagram explaining a general mobile communication system.
Figure 5:
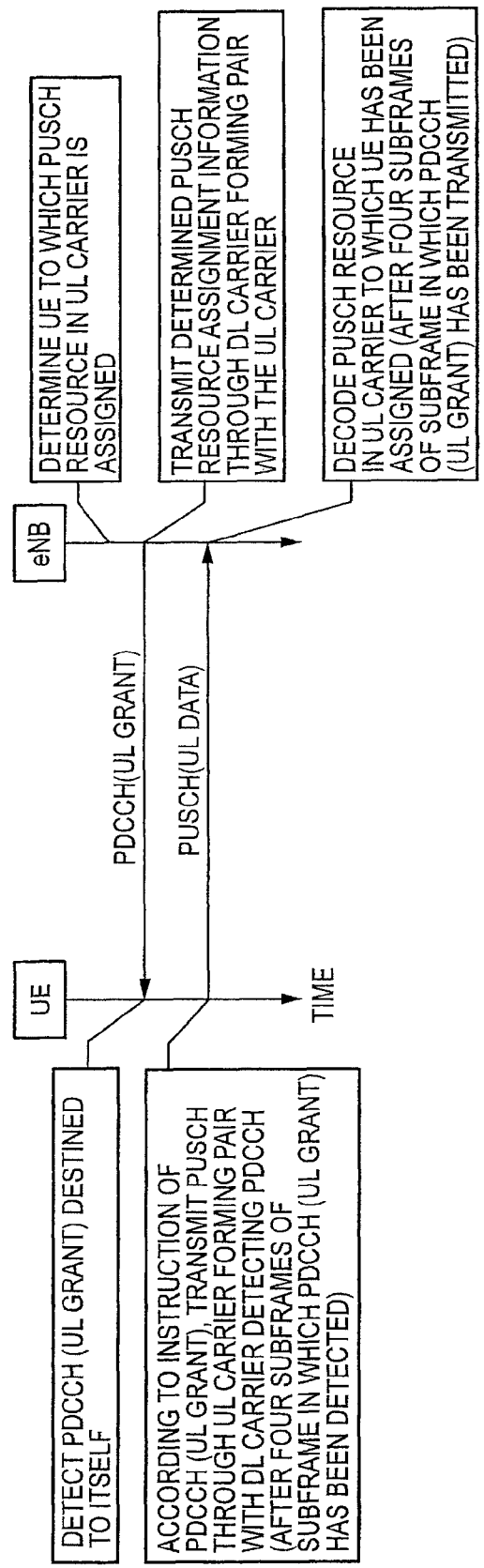
FIG. 5 is a diagram explaining a general mobile communication system.
Figure 6:
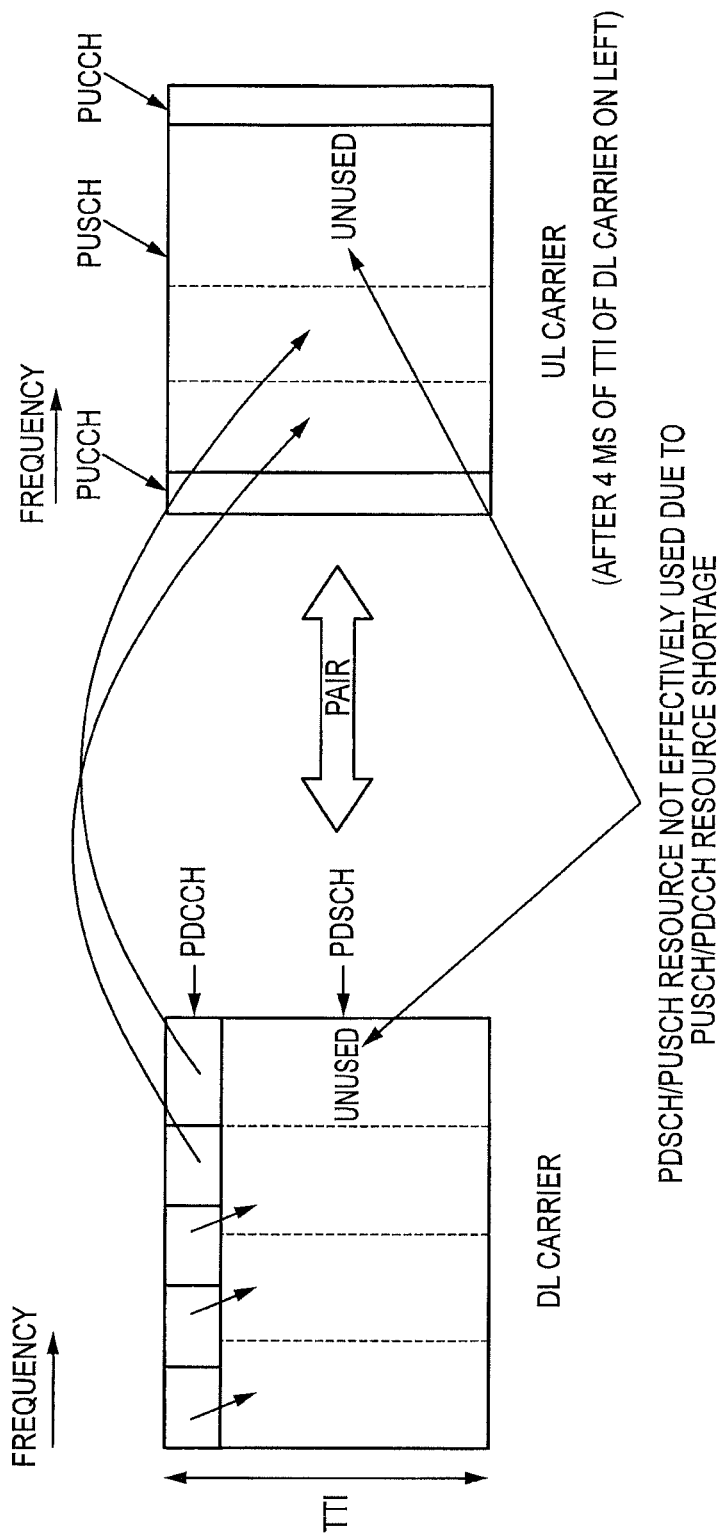
FIG. 6 is a diagram explaining a general mobile communication system.
Figure 7:
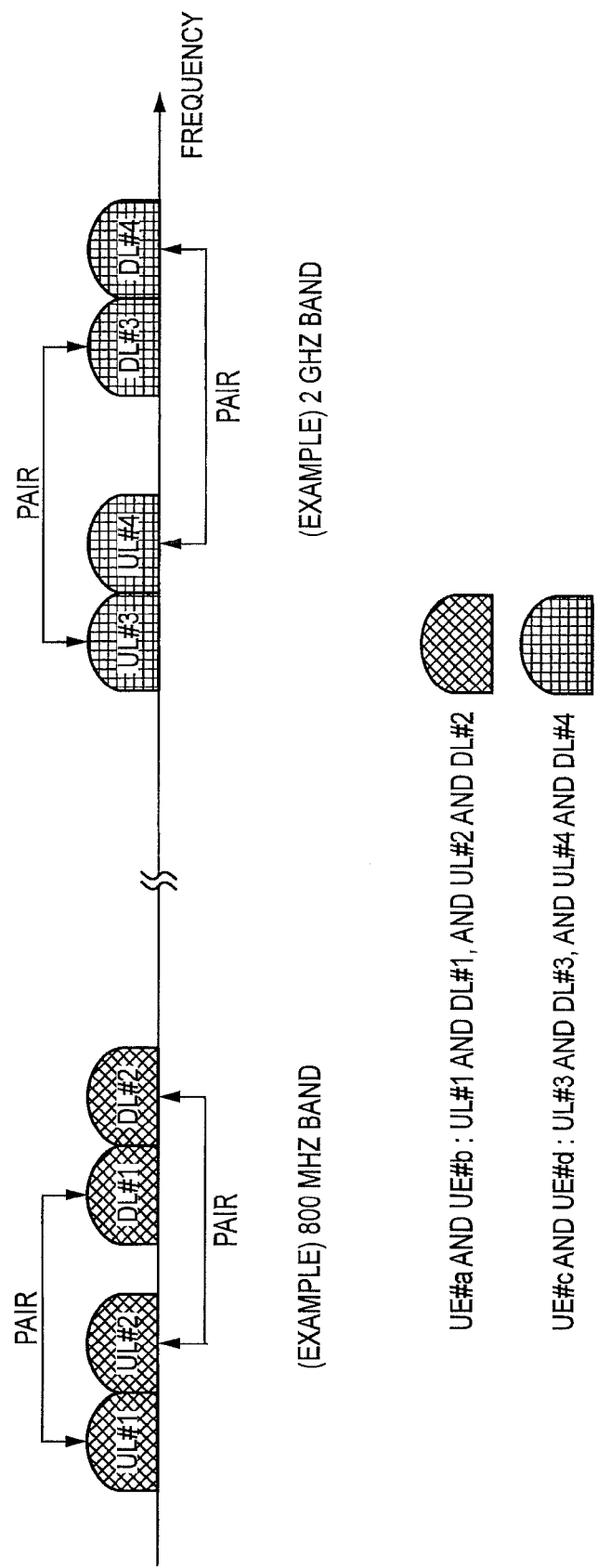
FIG. 7 is a diagram explaining a general mobile communication system.
Figure 8:
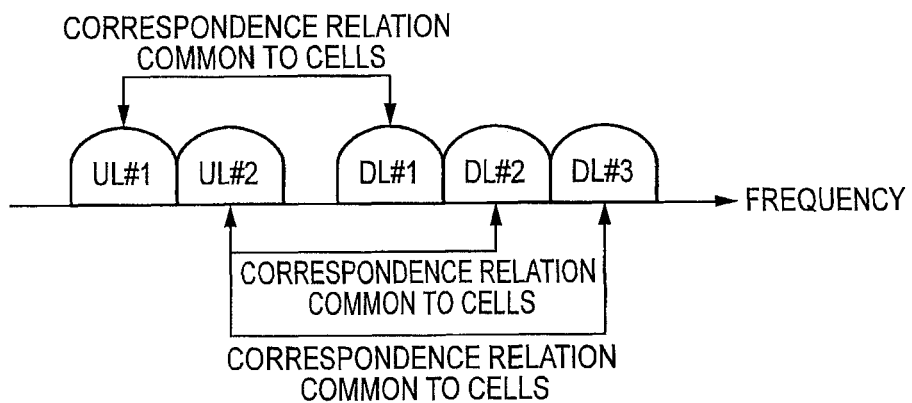
FIG. 8 is a diagram explaining a general mobile communication system.

As illustrated in FIG. 3, the mobile communication system according to the present embodiment is provided with two UL carriers #1 and #2 and three DL carriers #1 to #3.

In the mobile communication system according to the present embodiment, the transmission unit 12 of the radio base station eNB is configured to individually notify the mobile station UE performing CA in advance of the correspondence relation between a DL carrier for transmitting an "UL grant" and an UL carrier assigned with a PUSCH resource by the "UL grant".

Here, the transmission unit 12 of the radio base station eNB may be configured to notify the correspondence relation through an RRC message or PDCCH.

In the example illustrated in FIG. 3, the transmission unit 12 of the radio base station eNB is configured to notify a mobile station UE#1 performing the CA of the correspondence relation (UE#1 specific pair) indicating that the UL carrier #1 and the DL carrier #1 form a pair, and the correspondence relation (UE#1 specific pair) indicating that the UL carrier #2 and the DL carriers #2 and #3 form a pair.

Furthermore, the transmission unit 12 of the radio base station eNB is configured to notify a mobile station UE#2 performing the CA of the correspondence relation (UE#2 specific pair) indicating that the UL carrier #1 and the DL carriers #1 and #2 form a pair, and the correspondence relation (UE#2 specific pair) indicating that the UL carrier #2 and the DL carrier #3 form a pair.

Moreover, the transmission unit 12 of the radio base station eNB is configured to notify a mobile station UE#3 performing the CA of the correspondence relation (UE#3 specific pair) indicating that the UL carrier #1 and the DL carriers #1 and #3 form a pair, and the correspondence relation (UE#3 specific pair) indicating that the UL carrier #2 and DL carrier #2 form a pair.

In this case, when PDCCH (UL grant) through a certain DL carrier is received, the reception unit 21 of the mobile station UE is configured to transmit an uplink data signal through an UL carrier forming a pair with the DL carrier using a PUSCH resource designated by the PDCCH (UL grant).

In accordance with the mobile communication system according to the present embodiment, when the number of DL carriers used in the system is larger than the number of UL carriers in the LTE-A scheme, it is possible to distribute the PDCCH (UL grant) to all the DL carriers.

The characteristics of the present embodiment as described above may be expressed as follows.

A first characteristic of the present embodiment is summarized in that a mobile communication method, in which a mobile station UE performs communication (CA) with a radio base station eNB using a plurality of carriers having different carrier frequencies, includes a step A of individually notifying, by the radio base station eNB, the mobile station UE performing the CA of the correspondence relation between a DL carrier (a downlink carrier) for transmitting an "UL grant (an uplink assignment signal)" and an UL carrier (an uplink carrier) assigned with a PUSCH resource (an uplink resource) by the "UL grant", and a step B of transmitting, by the mobile station UE, an uplink data signal using the PUSCH resource through the UL carrier based on the aforementioned correspondence relation when the "UL grant" is received through the DL carrier.

In the first characteristic of the present embodiment, in the step A, the radio base station eNB may also notify the aforementioned correspondence relation through an RRC message.

A second characteristic of the present embodiment is summarized in that a radio base station eNB includes a transmission unit 11 configured to individually notify a mobile station UE, which performs CA with the radio base station eNB using a plurality of carriers having different carrier frequencies, of the correspondence relation between a DL carrier for transmitting an "UL grant" and an UL carrier assigned with a PUSCH resource by the "UL grant".

In the second characteristic of the present embodiment, the transmission unit 11 may also be configured to notify the aforementioned correspondence relation through an RRC message.

A third characteristic of the present embodiment is summarized in that a mobile station UE, which is configured to perform CA with a radio base station eNB using a plurality of carriers having different carrier frequencies, includes a reception unit 21 configured to receive the correspondence relation between a DL carrier for transmitting an "UL grant" and an UL carrier assigned with a PUSCH resource by the "UL grant" from the radio base station eNB, and a transmission unit 22 configured to transmit an uplink data signal using the PUSCH resource through the UL carrier based on the aforementioned correspondence relation when the "UL grant" is received through the DL carrier.

It is noted that the operation of the above-described the mobile station UE or the radio base station eNB may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the mobile station UE or the radio base station eNB. Further, such a storage medium or a processor may be arranged, as a discrete component, in the mobile station UE or the radio base station eNB.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, in accordance with the present invention, it is possible to provide a mobile communication method, a radio base station, and a mobile station, by which it is possible to distribute PDCCH (UL grant) to a plurality of DL carriers when CA is performed.

REFERENCE SIGNS LIST eNB . . . Radio base station
11 . . . Scheduling unit
12 . . . Transmission unit
UE . . . Mobile station
21 . . . Reception unit
22 . . . Transmission unit

The invention claimed is:

1. A mobile communication method, in which a mobile station performs communication with a radio base station using a plurality of carriers having different carrier frequencies, comprising:
   a step A of individually notifying, by the radio base station, the mobile station performing the communication of a correspondence relation indicating relation between a downlink carrier for transmitting an uplink assignment signal and an uplink carrier to which an uplink resource is assigned by the uplink assignment signal, the correspondence relation excluding a cell specific pair, and
   a step B of transmitting, by the mobile station, an uplink data signal using the uplink resource through the uplink carrier based on the correspondence relation when the uplink assignment signal is received through the downlink carrier.

2. The mobile communication method according to claim 1, wherein, in the step A, the radio base station notifies the correspondence relation through an RRC message.

3. A radio base station comprising:
   a transmission unit that is configured to individually notify a mobile station, which performs communication with the radio base station using a plurality of carriers having different carrier frequencies, of a correspondence relation indicating relation between a downlink carrier for transmitting an uplink assignment signal and an uplink carrier to which an uplink resource is assigned by the uplink assignment signal, the correspondence relation excluding a cell specific pair.

4. The radio base station according to claim 3, wherein the transmission unit is configured to notify the correspondence relation through an RRC message.

5. A mobile station, which is configured to perform communication with a radio base station using a plurality of carriers having different carrier frequencies, comprising:
- a reception unit configured to receive a correspondence relation indicating relation between a downlink carrier for transmitting an uplink assignment signal and an uplink carrier to which an uplink resource is assigned by the uplink assignment signal from the radio base station, the correspondence relation excluding a cell specific pair; and
- a transmission unit configured to transmit an uplink data signal using the uplink resource through the uplink carrier based on the correspondence relation when the uplink assignment signal is received through the downlink carrier.

\* \* \* \* \*